Feb. 10, 1970   R. CURKO   3,494,626
SELF-CENTERING PRECISION JAW CHUCK
Filed Dec. 27, 1967   2 Sheets-Sheet 1

INVENTOR
Ralph Curko

BY Sidney W Russell
ATTORNEY

Feb. 10, 1970  R. CURKO  3,494,626
SELF-CENTERING PRECISION JAW CHUCK
Filed Dec. 27, 1967  2 Sheets-Sheet 2

INVENTOR
Ralph Curko

BY *Sidney W Russell*
ATTORNEY

United States Patent Office 3,494,626
Patented Feb. 10, 1970

3,494,626
SELF-CENTERING PRECISION JAW CHUCK
Ralph Curko, Hoboken, N.J., assignor to Quality Tool & Die Co., Inc., Hoboken, N.J., a corporation of New Jersey
Filed Dec. 27, 1967, Ser. No. 693,934
Int. Cl. B23b 31/16, 5/22; B22b 5/34
U.S. Cl. 279—66        8 Claims

ABSTRACT OF THE DISCLOSURE

A precision two-jaw chuck device wherein the piece to be supported is automatically centered upon the center line axis, the jaws being mounted for only uni-directional movement away from or toward each other, and being spring biased outwardly but having roller means on the outer edges thereof that engage the angled edges of a wedge element, the wedge element when moved inwardly driving the jaws together and when moved reversely, permitting the jaws to separate from each other.

---

This invention relates to a jaw chuck assembly and is more particularly directed to a chuck unit wherein the object to be received therein, whether round, square, rectangular, or other configuration, is always centered with regard to the axis of rotation of the device. A primary feature of the arrangement is that, despite movement of the jaws away from or toward each other to accommodate different sized pieces (within the capacity of the chuck), the object, and of whatever size, is always centered, each jaw being subjected to precisely the same amount of even and continuous movement when the jaws move from the closed to open position, or vice versa.

Precision of jaw movements is assured by maintaining the jaws for slidable or reciprocatory movement in a tenon-groove dovetail arrangement, this form of lock or position maintaining assembly, while assuring freedom of reciprocatory movement for the purpose of adjustment, also preventing any substantial side displacement or other alteration of the adjusted position when the device is subjected to even relatively high loads of stress or shear.

The nature of the invention may further be briefly and preliminarily described as follows: Two opposed jaws are positioned for sliding movement in a supporting dovetail arrangement, designed in such a way that any movement of one jaw causes like and equal movement of the other, to either close or open them. Riding upon a roller type bearing seated within an angular jaw pusher element or wedge, movement of that wedge in one direction causes closing of the jaws, due to the angular formation, while movement in the opposite direction, and through spring bias against the jaws, causes the latter to open or separate from each other. Because of the two angled formations in the wedge element, each of which ride against a roller bearing rotatably mounted in each jaw, the jaws can only slide toward the center evenly, the two angles being of like angularity with regard to the center line of the unit. Thus any round or square part of an over-all size within the limitations of the widest opening of the jaws is always centrally held in an axial position. The invention thus eliminates the normal "setting time" period which is encountered when a piece must be aligned exactly upon the central or turning axis. Also in this same regard and in the instant case accurate setting is assured as extremely close tolerances can be accommodated—the structure of the unit is such as to permit the interfitting parts to be ground and matched within limitations in the neighborhood of .0001 inch.

The prior art is replete with chucks long since in common usage having more than two jaws; a typical example is the three jaw unit generally found in all kinds of equipment, as lathes, drill presses, et cetera. When the three jaw unit is used with regard to a perfectly round piece, the operator can center the piece with relative ease, a typical exemplification of this being the insertion of a drill in this ordinary type of device. However, this does not hold true with regard to a work piece which is other than round, and it is with regard to such irregular articles to be machined that the instant invention is particularly adaptable. Thus, if, in cross section, the work piece be rectangular in configuration, or oval, hexagonal, et cetera, the two jaw set-up, as provided for this invention, with the vertical axis being absolutely unvariable, will seat such piece on the center line with elimination of the usual indicating and setting times. As indicated in the foregoing, this is because the two jaws can only slide toward the center evenly as the result of the two angles on the wedge, which angles are centrally ground.

It is, accordingly, a primary object of the invention to provide a self-centering precision jaw chuck which will permit acceptance of any irregularly shaped piece, within the limitations of the chuck itself, and will automatically and consequent upon closure of the jaws upon the piece, exactly position the center line axis of the piece coincident with the center line or turning axis of the instrument.

A further object of the invention is to provide a device of the type referred to wherein the jaws, being spring biased to a constantly open position, are readily adjusted to the desired setting by a single screw element which, when exerted against one side of the referred to wedge formation, causes closing of the jaws. Upon retraction of that screw element, the referred to spring bias causes reverse movement of the jaws, permitting them to open by sliding contact against the angular configuration of the wedge element.

Another object of the invention is to provide an assembly wherein, whether the movement of the jaws with respect to each other is outward or inward, that movement is precisely in the same amount in either direction with respect to each jaw, the jaws being mounted in the referred to dovetail configuration, being confined to that path of movement and without distortive displacement in any other direction.

An additional object of the invention is to provide a unit of the described type where each jaw rides upon a roller bearing or like rotatable element and the latter, in turn, again by spring bias imposed between the jaws to exert separatory movement, is forced into contact with an angularly edged wedge formation. As the latter is moved toward the center axis, or the axis of rotation of the unit when used, e.g., in a lathe arrangement, the angular inclination of the wedge forces the rollers together with consequent movement of the jaws toward each other; whereas, with retraction of the wedge or reverse movement away from the axis of rotation, appropriate spring bias between the jaws exerts thrust outwardly, thus causing separation of the jaws.

It is a further objective of the invention to provide a chuck wherein only two jaws are utilized, these being so mounted as to reciprocate toward and away from each other in only a single direction, this being in a direction right angularly to the center axis or turning point of the unit, with any other angular deviation of the jaws or movement thereof in any other direction being precluded; centering of the piece, whether round or not, is thus achieved because the two jaw system permits the jaws to only slide evenly toward the center axis of the unit, and this because of two angles on the wedge or pusher element, which angles are centrally ground.

Finally, it is a fundamental object of the invention to provide a precision jaw chuck which is universally applicable to all types of machining apparatus, as borers, tappers, drillers, lathes, jig borers and grinders, cylindrical grinders, millers, electrical discharge machines, et cetera; in this same regard, and because of its capability to hold parts or objects centrally, it is also applicable to the foregoing type of equipment whether used in fixed or rotating fashion. It may also be used as a checking device for the precision checking of irregular parts.

Other advantages and objectives of the invention will become apparent to those skilled in the art upon consideration of the following more detailed explanation thereof. In the instant case, the preferred embodiment of the invention, as to size, is one wherein the jaws, when open, permit insertion of a piece one inch square, or, if the piece be round, one inch in diameter. But, of course, this is exemplary only, and the chuck device of this invention may be altered to any side to suit given conditions and requirements.

At any rate, the following more particular description is made with reference to the drawings appended hereto, and wherein.

Figure 5:
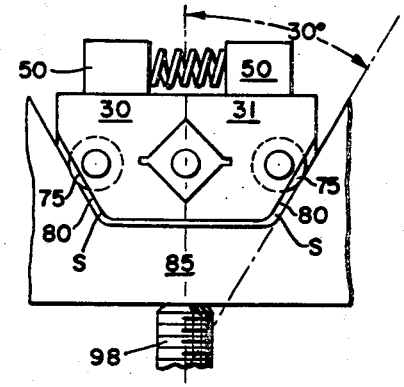
Figure 6:
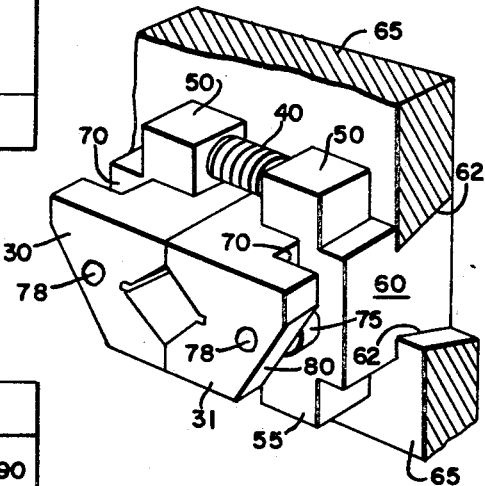

FIGURE 5 is a partial view, similar to that found in FIGURE 3, again indicating the jaws in closed position; and FIGURE 6 is a perspective view, partially in section, illustrating primarily the physical structure of the two jaw formations and the relative positioning of the rollers within the appropriate side slots or grooves formed therein, which rollers contact the respective adjacent and complementary angled surfaces of the wedge or pusher element.

Figure 1:
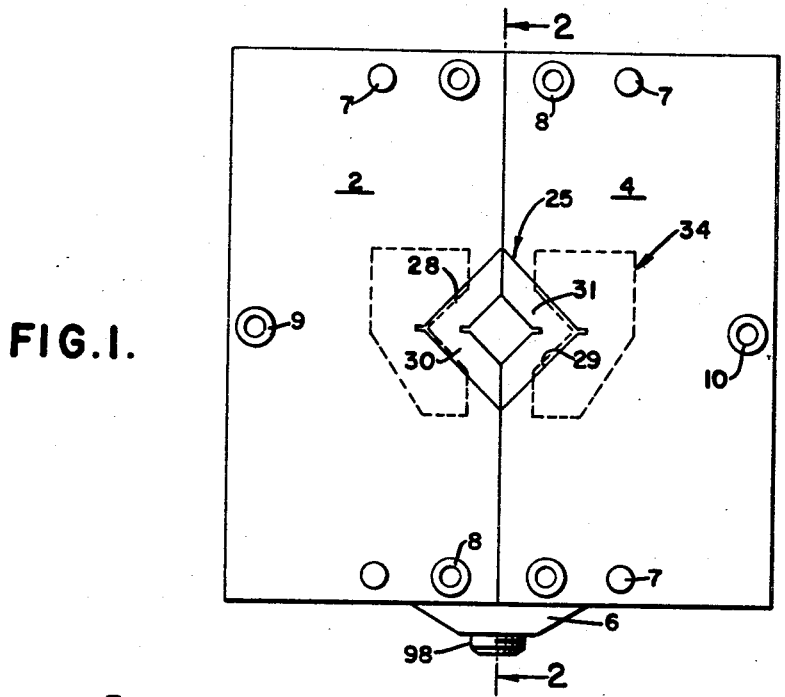
FIGURE 1 is a front elevation view of the invention indicating the jaw structures in closed position and, also, showing, in dotted line, the relative position of these jaws when opened to their fullest extent.
Figure 2:
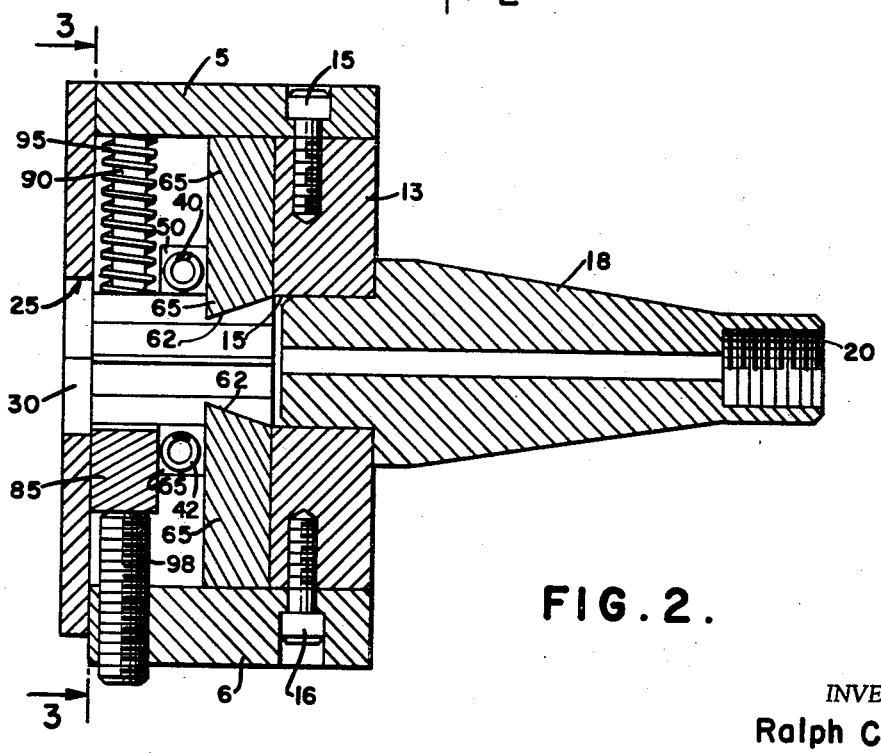
FIGURE 2 is a section view of the invention taken on line 2—2 of FIGURE 1.

Referring more particularly to these figures, and especially FIGURES 1 and 2, it is seen that the housing for the moveable parts enabling precision adjustment of the chuck jaws comprises a front plate formed of two adjoining pieces 2 and 4. This is secured to the top plate or rail 5 and the bottom plate or rail 6 by two separate media—dowels or pins 7 which assure, through precision drilling, accurate fitting and which are press fitted through plates 2 and 4 into appropriate apertures in the top and bottom rails 5 and 6. Suitable screw elements 8 are also employed for this same purpose. These front plates 2 and 4 are also secured in like manner, as by bolts 9 and 10, to the side housings 11 and 12.

The back of the housing takes the form of an apertured plate 13, apertured as at 15, to receive a shank 18, the latter being provided with threaded aperture 20 or other attaching means for securing it to such a member as a drive shaft of a turning lathe. The shank 18 is reduced in size, as at its inner end and as shown in FIGURE 2, to interfit with the aperture 15, an extremely precise press fit here being desirable, and if desired, further strengthened as a matter of rigid connection to the back plate 13 by any usual media, as welding.

The top and bottom plates 5 and 6 of the housing are, in turn, secured to this back rail or plate 13, again through any usual media as by bolts 15 and 16.

Each of the front plates 2 and 4 at the respective inner center line and adjoining edges thereof are cut to form a right angular V, as indicated at 28 and 29. These two V configurations when positioned together as shown in FIGURE 1 form a square, this representing an opening in the front or object receiving side, this opening being generally indicated at 25. Such opening 25 is complementary to the size of the two jaw elements of the chuck when these are in closed and contacting position. These two jaw elements 30 and 31 are, however, moveable and although shown as being closed in FIGURE 1 so as to fill the area represented by opening 25 in the two plates 2 and 4, are subject to lateral movement a limited distance to a position represented in dotted line at 34 in this figure, and as will be described. In the representation of the invention here being described, the opening 29 represents an approximate one inch square, so that with the jaws in retracted position, as shown in dotted line at 34, the object to be fixedly positioned in the chuck would not be one greater than a square of that dimension, or, if round, having a diameter greater than about one inch. As indicated, however, the unit can be fabricated in larger or smaller size, so long as the interrelated components thereof approximate the relative proportioning which is illustrated in the drawings appended hereto.

Figure 3:
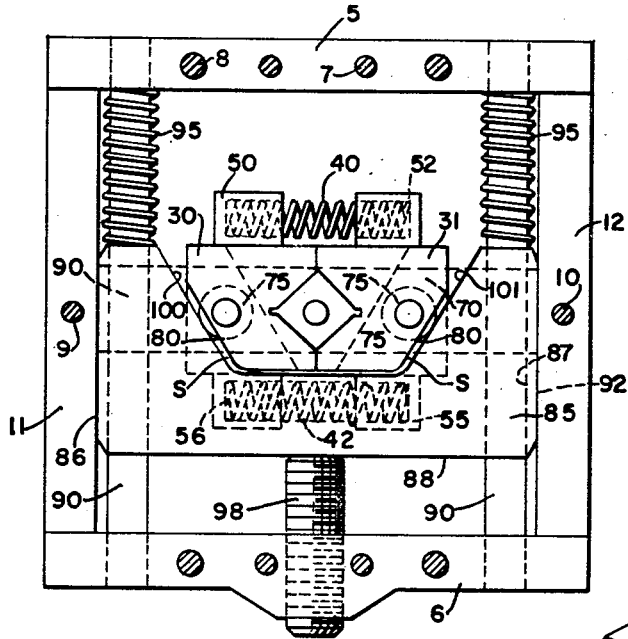
FIGURE 3 is a section view of the invention taken on line 3—3 of FIGURE 2 and illustrating the relative position of the several elements of the combination when the jaws are in closed position.
Figure 4:
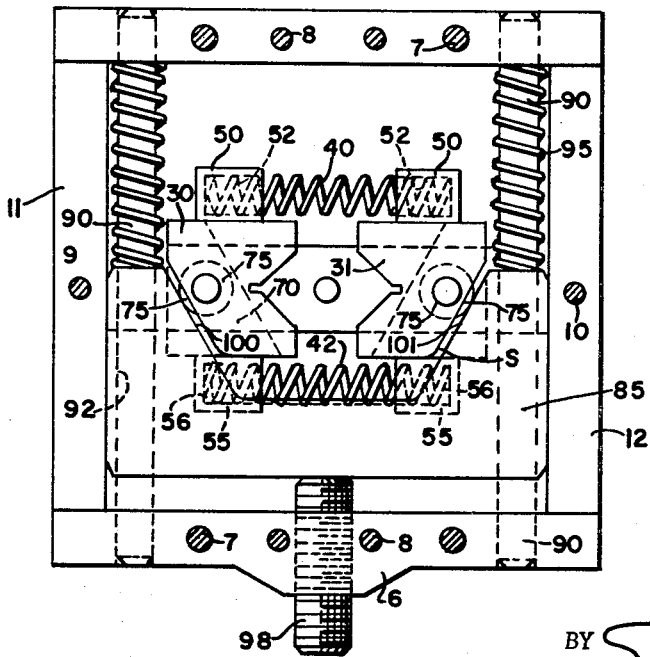
FIGURE 4 is a section view similar to FIGURE 3 but illustrating the jaws in open position, i.e., with the wedge formation fully retracted and with the roller supports for the jaws consequently in contact with the wedge at the upper portion of the slanting edges thereof.

As stated in the foregoing, the two jaw members 30 and 31 are slidably mounted (laterally) with respect to each other and to this end two springs, on opposite sides of the jaws, 40 and 42, are disposed between them so that when the wedge member is retracted such helical springs evenly thrust the jaws apart to the position shown in FIGURE 4. Each jaw element 30 and 31, to this end, is fabricated integrally or otherwise, with upper and lower spring retaining extensions 50 and 55 respectively, each of which is suitably bored to receive the respective ends of these springs, and as seen in FIGURES 3 and 4. Thus the upper spring 40 is seated in the bores 52 and the lower spring 42 is positioned in like fashion within bores 56.

Each jaw is also fabricated with a rearwardly extending portion 60. The latter takes the form of a dovetail tenon which is adapted to slidably interfit with an appropriate dovetail groove 62 formed in the back plate 65. The plate 65 may also be made integrally with rear plate 13, although for purposes of simplicity of fabrication it may be separately formed and then bolted or otherwise affixed in any suitable fashion to the back plate 13. At any rate, and as will be apparent from particularly FIGURE 6, each jaw element 30 and 31 is then so mounted that a slidable relationship between them is possible. With the dovetail type of mounting the jaws 30, 31 are thus maintained in final adjusted position with great rigidity and full resistance to any movement from a position centering the piece accurately on the rotating axis of the unit.

Of course since springs 40 and 42, as indicated, are so disposed as to separate and open jaws 30 and 31, a means must be utilized to not only maintain them in the desired position but easily effect adjustment of the distance between the jaws. To this end, and rearwardly of the face of the jaws, each one is provided with an angular channel 70 (see FIGURE 6). The angularity of that channel in this modification of the invention is 30° to a line parallel to the vertical axis of the unit as same is, e.g., illustrated in FIGURE 3. Note also the indicated line of angularity in FIGURE 5. The jaw pusher or wedge is likewise constructed with two roller contacting edges of like angularity, as will be described.

In any event, seated within each groove 70 of each jaw is a roller bearing 75 mounted for rotation upon a shaft or pin 78 that is positioned through the front wall of each jaw, through the channel 70, and into the back wall thereof or the portion 60, and in a manner that will be well understood. These pins 78 are so mounted, and so depicted, that a segment of the periphery of each roller 75 extends a short distance beyond the outer edge 80 of each jaw, these edges 80 likewise being canted or angled in like amount, to wit, in an amount of 30° to the vertical (again note angularity indicated in FIGURE 5).

The pusher element or wedge formation 85 is clearly shown in FIGURES 3 to 5 inclusive. It is formed with parallel sides, as at 86, 87, such sides riding within or sliding against the side frame member 11 on the one hand and the side plate element 12 on the other. It is further provided with a straight bottom edge 88, right angular to the sides and parallel to the upper surface of rail 6.

The wedge 85 is mounted for reciprocatory movement in a vertical direction, as seen in these figures, upon two opposed shafts or guide pins 90 which at one end are pressed fitted into the top rail 5 and in like manner secured to the bottom rail 6; again, the rods 90 are parallel to each other, as shown, the wedge or pusher element 85 being suitably apertured at each side thereof and as at 92 to receive these rods with relatively close tolerance but such as to permit smooth and even movement thereupon without binding or restriction.

The wedge 85 is constantly urged toward the piece 6 by means of helical springs 95, mounted at the upper ends of rods 90. The upper ends of spring 95 bear against the inner face of the element 5 and the opposite ends thereof bear against the respective upper ends of the wedge or pusher, and as clearly shown in FIGURES 3 and 4.

A threaded element 98 is centrally located within the lower housing structure or rail 6 and sufficiently near the front edge of that element 6 (as seen in FIGURE 2) as to bear upon the under or lower edge 88 of the wedge element 85. Such threaded element 98 is provided with a hex depression (not shown) at its outer end to accommodate the usual hex wrench (or other means) which may be used to rotate the screw element 98, thus to vary the distance of travel thereof and consequently amount of traverse of the wedge element 85 upon the rods 95. The element 88 is so designed to remain in its adjusted position during operation of the chuck, i.e., rotation or otherwise.

As indicated in the foregoing, the jaw contacting portion or jaw activating part of the pusher element 85 is found in the angled edges 100 and 101 therein, these being angled in the same amount as the angled edges of the jaws 30 and 31, as heretofore described. These angled edges contact the periphery of the two respective rollers 75, at that point where they extend beyond edges 80 of jaws 30, 31, thus leaving a space between the jaw elements and the angled edge formations of the pusher element 85, and as so indicated at S.

In summary, and viewing FIGURES 3 and 4, it is seen that the jaws are constantly urged outwardly by springs 40, 42, with the pusher or wedge element 85 constantly being urged downwardly by the two spring bias elements 95. However, motion of the jaws can only be in a lateral direction or outwardly away from each other and without any upward or downward movement in a vertical direction, or any other angular deviation, this because of the tongue-dovetail arrangement heretofore described, limiting the jaw movement to only the described lateral, one path, type of movement. In this regard, such jaw movement is in only one plane, this plane movement, and as seen in e.g. FIGURES 3 and 4, being normal or right angularly to the axis of rotation of the device and as such is represented by the member 20. Also, these jaws are mounted across the center of the axis of rotation, as particularly shown in FIGURE 1.

When the jaws are closed and the inner faces thereof contacting each other, as shown in FIGURE 3, the wedge element 85 is at its uppermost position; it has been extended to that point by upward movement of the threaded member 98. Further movement is precluded by interface jaw contact. However, when the element 98 has been retracted to the position shown in FIGURE 4, the wedge element is correspondingly also lowered or retracted as impulsed by springs 95, with the result that the jaws are permitted to open or extend laterally that distance corresponding to the increased lateral distance between the two angular edges 100, 101, of the wedge element 85.

As a result of this arrangement and irrespective of the lateral distance between the two jaws 30, 31, the center point between them is always coincident with the center axis or axis of rotation of the entire assembly, as will be apparent from a comparison of the position of the respective jaw members, and as illustrated in FIGURES 3 and 4. And as stated, movement of the jaws in any other direction than one exactly normal or right angular to a vertical line drawn through the center axis of the unit is precluded by the tenon-dovetail arrangement (60, 62) which, although permitting reciprocation of the jaws in the manner indicated, prohibits distortive movement in any other direction.

Although other expedients and alternates, in view of the foregoing explanation, may be obvious to those skilled in the art, it is intended that my invention may not be limited except as such is set forth and delineated in the following claims.

I claim:

1. In a precision two-jaw chuck mounted for rotation about a centrally disposed axis, the improvement comprising a pair of jaws adapted to receive and center an object therebetween, said jaws being mounted centrally across said axis for movement away from and toward each other in but one plane which is normal to the axis of rotation of said chuck, said mounting including a back plate, a single dovetail groove in said plate positioned in said plane, a tenon in the rear portion of each said jaws complementary to said dovetail groove and slidably movable therein, thereby permitting said movement in said one plane but preventing angular movement in any other direction, bias means exerting thrust to force said jaws away from each other, each of said jaws having a roller element on the outer portion thereof, means to contact said roller elements comprising a movable wedge member spring biased away from said jaws having roller element contact edges of equal angularity to said plane, whereby when said wedge member is moved toward said jaws, said jaws are forced together and when said wedge member is reversely moved said jaw bias means correspondingly separates said jaws.

2. The invention as defined in claim 1 wherein said equal angularity is in an amount of about 30° to a line normal to said plane.

3. The invention as defined in claim 2 wherein said jaws are spring biased toward a normally open position and said wedge is movable in a direction normal to said jaw movement.

4. The invention as defined in claim 3 wherein means are provided to propel said wedge toward said jaws and lock said wedge in adjusted position.

5. The invention as defined in claim 1 wherein means is provided to drive said wedge member toward said jaws and lock said wedge member in a predetermined, adjusted position.

6. The invention as defined in claim 1 wherein said bias means comprise springs and said wedge member is provided with means to drive said wedge member toward said jaws and lock said wedge member in adjusted position.

7. The invention as defined in claim 6 wherein said equal angularity is in an amount of about 30° to a line normal to said plane.

8. The invention as defined in claim 7 wherein a groove is provided in the outer side of each of said jaws, and said roller is mounted in each of said grooves and extends outwardly from each of said jaws a distance sufficient to contact said roller element contacting edges.

References Cited

UNITED STATES PATENTS

| 620,495 | 2/1899 | Ramseaur | 269—234 |
|---|---|---|---|
| 1,227,632 | 5/1917 | Lagerback | 279—42 |
| 2,514,292 | 7/1950 | Paulson | 269—157 |
| 2,850,926 | 9/1958 | Jobe | 269—234 X |
| 3,145,462 | 8/1964 | Bognar | 279—110 |
| 2,597,712 | 5/1952 | Drissner | 279—74 |

ROBERT C. RIORDON, Primary Examiner

U.S. Cl. X.R.

269—234